US009630321B2

(12) United States Patent
Bradski et al.

(10) Patent No.: US 9,630,321 B2
(45) Date of Patent: *Apr. 25, 2017

(54) CONTINUOUS UPDATING OF PLAN FOR ROBOTIC OBJECT MANIPULATION BASED ON RECEIVED SENSOR DATA

(71) Applicant: Industrial Perception, Inc., Mountain View, CA (US)

(72) Inventors: Gary Bradski, Palo Alto, CA (US); Kurt Konolige, Menlo Park, CA (US); Ethan Rublee, Mountain View, CA (US); Troy Straszheim, Palo Alto, CA (US); Hauke Strasdat, Mountain View, CA (US); Stefan Hinterstoisser, Palo Alto, CA (US)

(73) Assignee: Industrial Perception, Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/964,724

(22) Filed: Dec. 10, 2015

(65) Prior Publication Data
US 2016/0089791 A1    Mar. 31, 2016

Related U.S. Application Data

(63) Continuation of application No. 14/212,994, filed on Mar. 14, 2014, now Pat. No. 9,238,304.
(Continued)

(51) Int. Cl.
*B25J 13/08*  (2006.01)
*B25J 9/16*   (2006.01)
(Continued)

(52) U.S. Cl.
CPC ............ *B25J 9/163* (2013.01); *B25J 5/00* (2013.01); *B25J 9/0093* (2013.01); *B25J 9/162* (2013.01);
(Continued)

(58) Field of Classification Search
CPC ........ B25J 19/021; B25J 9/0093; B25J 9/162; B25J 9/1697; G01B 11/03; G01B 5/008;
(Continued)

(56) References Cited

U.S. PATENT DOCUMENTS 4,402,053 A    8/1983   Kelley et al.
4,831,549 A    5/1989   Red et al.
(Continued)

FOREIGN PATENT DOCUMENTS

DE    10324755    9/2004
EP    2156927     2/2010
(Continued)

OTHER PUBLICATIONS

Agarwal, Sameer, Mierle, Keir, and others: Ceres Solver. http://code.google.com/p/ceres-solver, last accessed Apr. 22, 2014, 2 pages.
(Continued)

*Primary Examiner* — Dalena Tran
(74) *Attorney, Agent, or Firm* — McDonnell Boehnen Hulbert & Berghoff LLP

(57) ABSTRACT

Example systems and methods allow for dynamic updating of a plan to move objects using a robotic device. One example method includes determining a virtual environment by one or more processors based on sensor data received from one or more sensors, the virtual environment representing a physical environment containing a plurality of physical objects, developing a plan, based on the virtual environment, to cause a robotic manipulator to move one or more of the physical objects in the physical environment, causing the robotic manipulator to perform a first action according to the plan, receiving updated sensor data from the one or more sensors after the robotic manipulator performs the first action, modifying the virtual environment based on
(Continued)

the updated sensor data, determining one or more modifications to the plan based on the modified virtual environment, and causing the robotic manipulator to perform a second action according to the modified plan.

20 Claims, 9 Drawing Sheets

Related U.S. Application Data

(60) Provisional application No. 61/793,151, filed on Mar. 15, 2013, provisional application No. 61/798,564, filed on Mar. 15, 2013, provisional application No. 61/798,505, filed on Mar. 15, 2013, provisional application No. 61/798,425, filed on Mar. 15, 2013.

(51) Int. Cl.
| | | |
|---|---|---|
| *G06T 17/00* | (2006.01) | |
| *B25J 19/02* | (2006.01) | |
| *B65G 47/46* | (2006.01) | |
| *B65G 47/50* | (2006.01) | |
| *G06K 9/00* | (2006.01) | |
| *G06T 7/00* | (2017.01) | |
| *G01B 11/25* | (2006.01) | |
| *G06K 9/46* | (2006.01) | |
| *G06K 9/52* | (2006.01) | |
| *G06T 7/60* | (2017.01) | |
| *H04N 5/33* | (2006.01) | |
| *H04N 13/02* | (2006.01) | |
| *B25J 9/00* | (2006.01) | |
| *B25J 5/00* | (2006.01) | |
| *B65G 41/00* | (2006.01) | |
| *B65G 61/00* | (2006.01) | |
| *B65H 67/06* | (2006.01) | |
| *H04N 13/00* | (2006.01) | |

(52) U.S. Cl.
CPC .......... *B25J 9/1612* (2013.01); *B25J 9/1664* (2013.01); *B25J 9/1671* (2013.01); *B25J 9/1687* (2013.01); *B25J 9/1694* (2013.01); *B25J 9/1697* (2013.01); *B25J 19/021* (2013.01); *B65G 41/008* (2013.01); *B65G 47/46* (2013.01); *B65G 47/50* (2013.01); *G01B 11/254* (2013.01); *G06K 9/00201* (2013.01); *G06K 9/4604* (2013.01); *G06K 9/4661* (2013.01); *G06K 9/52* (2013.01); *G06T 7/0059* (2013.01); *G06T 7/0075* (2013.01); *G06T 7/0085* (2013.01); *G06T 7/60* (2013.01); *G06T 17/00* (2013.01); *H04N 5/33* (2013.01); *H04N 13/0239* (2013.01); *B65G 61/00* (2013.01); *B65H 67/065* (2013.01); *G05B 2219/31312* (2013.01); *G05B 2219/40053* (2013.01); *G05B 2219/40298* (2013.01); *G05B 2219/40442* (2013.01); *H04N 2013/0081* (2013.01); *Y10S 901/01* (2013.01); *Y10S 901/02* (2013.01); *Y10S 901/09* (2013.01); *Y10S 901/47* (2013.01)

(58) Field of Classification Search
CPC ........ G01B 11/254; G05B 2219/31312; G05B 2219/40053; G06K 9/00201; G06K 9/4604
USPC .............. 700/253, 236, 237, 214; 901/1, 14
See application file for complete search history.

(56) References Cited

U.S. PATENT DOCUMENTS

| | | | |
|---|---|---|---|
| 5,541,485 A | 7/1996 | Teichmann et al. | |
| 5,992,751 A | 11/1999 | Laser | |
| 6,493,607 B1 | 12/2002 | Bourne et al. | |
| 7,099,745 B2 | 8/2006 | Ebert | |
| 7,587,082 B1 | 9/2009 | Rudin et al. | |
| 7,818,091 B2 | 10/2010 | Kazi et al. | |
| 7,957,583 B2 | 6/2011 | Boca et al. | |
| 7,967,543 B2 | 6/2011 | Criswell et al. | |
| 7,996,114 B2 | 8/2011 | Ban et al. | |
| 8,108,072 B2 | 1/2012 | Zhao et al. | |
| 8,229,595 B2 | 7/2012 | Seelinger et al. | |
| 8,286,877 B2 | 10/2012 | Olmstead | |
| 8,306,314 B2 | 11/2012 | Tuzel et al. | |
| 8,306,663 B2 | 11/2012 | Wickham | |
| 8,352,074 B2 | 1/2013 | Guochunxu et al. | |
| 8,360,318 B2 | 1/2013 | Reynolds et al. | |
| 8,379,014 B2 | 2/2013 | Wiedemann et al. | |
| 8,411,929 B2 | 4/2013 | Silver | |
| 8,437,535 B2 | 5/2013 | Boca et al. | |
| 8,559,699 B2 | 10/2013 | Boca | |
| 8,600,161 B2 | 12/2013 | Simon et al. | |
| 8,825,212 B2 | 9/2014 | Irie et al. | |
| 8,935,004 B2 | 1/2015 | Iida | |
| 9,089,966 B2* | 7/2015 | Domae | B25J 9/1612 |
| 9,205,563 B2* | 12/2015 | Kutsukake | B25J 9/1697 |
| 2002/0150450 A1 | 10/2002 | Bevirt et al. | |
| 2008/0279446 A1 | 11/2008 | Hassebrook et al. | |
| 2008/0300723 A1 | 12/2008 | Ban et al. | |
| 2009/0118864 A1 | 5/2009 | Eldridge et al. | |
| 2010/0092267 A1 | 4/2010 | Najdovski et al. | |
| 2010/0286827 A1 | 11/2010 | Franzius et al. | |
| 2011/0320039 A1 | 12/2011 | Hsu et al. | |
| 2012/0095322 A1 | 4/2012 | Tsekos et al. | |
| 2012/0239194 A1 | 9/2012 | Kagawa | |
| 2012/0294510 A1 | 11/2012 | Zhang et al. | |
| 2013/0010081 A1 | 1/2013 | Tenney et al. | |
| 2013/0041508 A1 | 2/2013 | Hu et al. | |
| 2013/0147944 A1 | 6/2013 | Zhang et al. | |
| 2013/0151007 A1 | 6/2013 | Valpola et al. | |
| 2013/0335535 A1 | 12/2013 | Kane et al. | |
| 2013/0345870 A1 | 12/2013 | Buehler et al. | |
| 2014/0012415 A1 | 1/2014 | Benaim et al. | |
| 2014/0019392 A1 | 1/2014 | Buibas | |
| 2014/0025198 A1 | 1/2014 | Mattern et al. | |

FOREIGN PATENT DOCUMENTS

| | | |
|---|---|---|
| WO | 2007/050776 | 5/2007 |
| WO | 2013/065003 | 5/2013 |

OTHER PUBLICATIONS

Curless, Brian et al., "A Volumetric Method for Building Complex Models from Range Images," Proceedings of the 23rd annual conference on Computer Graphics and Interactive Techniques, ACM, New York, New York, Aug. 4-9, 1996, pp. 303-312.

Davis, James et al., "Spacetime Stereo: A Unifying Framework for Depth from Triangulation," IEEE Transactions on Pattern Analysis and Machine Intelligence, Feb. 2005, pp. 296-302, vol. 27, No. 2.

Greene, D. H., "The decomposition of polygons into convex parts," in Computational Geometry, ser. Adv. Comput. Res., F. P. Preparata, Ed. Greenwich, CT: JAI Press, 1983, pp. 235-259, vol. 1, date not available.

Hoppe, H. et al., Surface Reconstuction from Unorganized Points, Computer Graphics (SIGGRAPH'92 proceedings), Jul. 1992, pp. 71-78, vol. 26, No. 2.

Jimenez, P. et al., "3D Collision Detection: a Survey," Computers & Graphics, 2001, pp. 269-285, vol. 25, No. 2, date not available.

John, J. Craig. "Introduction to robotics: mechanics and control," Addison-Wesley Publishing Company, Inc., Reading, MA, 1989, Chapters 3, 4 and 7, pp. 68-151 and 227-261, date not available.

(56) References Cited

OTHER PUBLICATIONS

Konolige, Kurt, "Projected Texture Stereo," Proceedings of the 2010 IEEE International Conference on Robotics and Automation (ICRA), May 3-7, 2010, p. 148-155.
Kuffner, J. "RRT-connect: An Efficient Approach to Single-Query Path Planning", IEEE International Conference on Robotics and Automation, 2000, pp. 1-7, date not available.
Lorensen et al., "Marching Cubes: A High Resolution 3D Surface Construction Algorithm," Computer Graphics, Jul. 1987, p. 163-169, vol. 21, No. 4.
Marns, Jack, Automated robotic truck loader optimizes shipping space, Smart Packaging, Jan. 1, 2012, http://www.packagingdigest.com/smart-packaging/automated-robotic-truck-loader-optimizes-shipping-space.
Newcombe et al., "KinectFusion: Real-Time Dense Surface Mapping and Tracking," Proceedings of the 2011 10th IEEE International Symposium on Mixed and Augmented Reality, IEEE Computer Society, Washington, DC, 2011, p. 127-136, date not available.
Nießner, M. et al., "Real-time 3D Reconstruction at Scale using Voxel Hashing," ACM Transactions on Graphics (TOG), 2013, date not available.
Okutomi et al., "A Multiple-Baseline Stereo," IEEE Transactions on Pattern Analysis and Machine Intelligence, Apr. 1993, pp. 353-363, vol. 15, No. 4.
Schulman, John et al., "Finding Locally Optimal, Collision-Free Trajectories with Sequential Convex Optimization," Robotics: Science and Systems (RSS), 2013, 10 pages, date not available.
Tsai et al., "A Single-Pixel Wireless Contact Lens Display," IEEE Transactions on Robotics and Automation, 1989, pp. 345-358, date not available.

\* cited by examiner

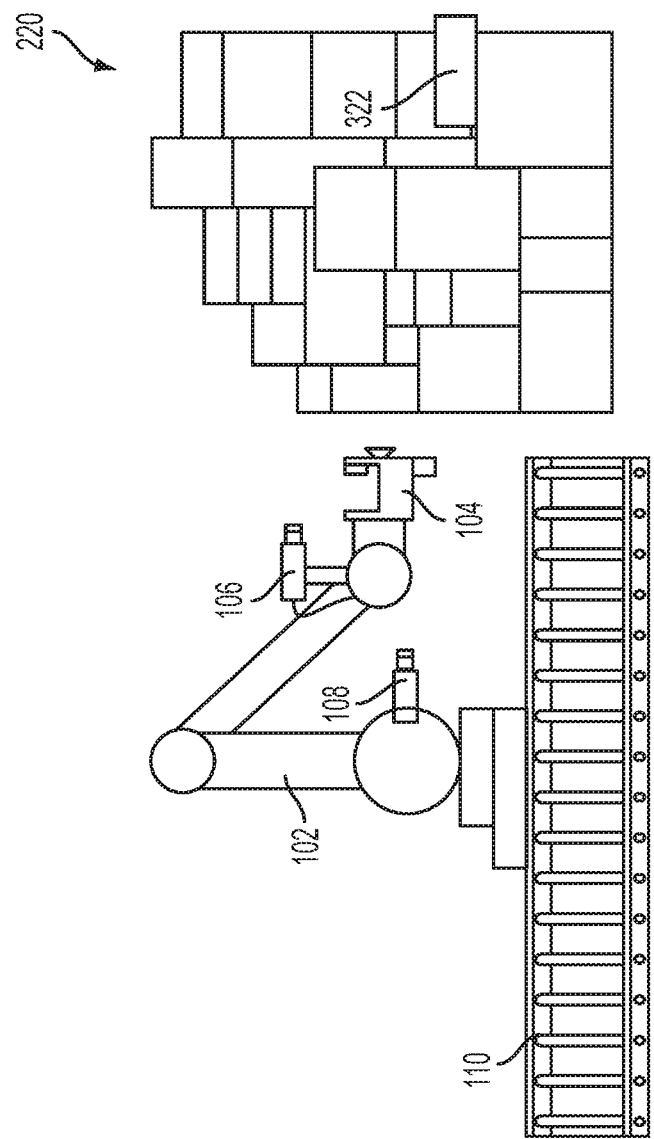

CONTINUOUS UPDATING OF PLAN FOR ROBOTIC OBJECT MANIPULATION BASED ON RECEIVED SENSOR DATA

CROSS REFERENCE TO RELATED APPLICATION

The present application claims priority to U.S. patent application Ser. No. 14/212,994 filed on Mar. 14, 2104 and entitled "Continuous Updating of Plan for Robotic Object Manipulation Based on Received Sensor Data" which claims priority to U.S. Provisional patent application Ser. No. 61/793,151 filed on Mar. 15, 2013 and entitled "Mixed Case Palletizing and Truck Loading/Unloading," U.S. Provisional patent application Ser. No. 61/798,425 filed on Mar. 15, 2013 and entitled "Environment Reconstruction and Trajectory Planning," U.S. Provisional patent application Ser. No. 61/798,564 filed on Mar. 15, 2013 and entitled "Object Reconstruction and Detection," and U.S. Provisional patent application Ser. No. 61/798,505 filed on Mar. 15, 2013 and entitled "Optical Sensors," which are each herein incorporated by reference as if fully set forth in this description.

BACKGROUND

Unless otherwise indicated herein, the materials described in this section are not prior art to the claims in this application and are not admitted to be prior art by inclusion in this section.

Robotic systems, such as a robotic arm containing a gripping component, may be used for applications involving picking up or moving objects. For instance, a robotic device may be used to fill a container with objects, create a stack of objects, or unload objects from a truck bed. In some cases, all of the objects may be of the same type. In other cases, a container or truck may contain a mix of different types of objects, such as boxed items, cans, tires, or other stackable objects. Such robotic systems may direct a robotic arm to pick up objects based on predetermined knowledge of where objects are in the environment.

SUMMARY

The present disclosure provides methods and apparatuses that allow for dynamic updating of a plan to move objects within an environment using a robotic device. A plan to move objects (e.g., to unload a truck or create a stack of objects on a pallet) may first be determined based on a virtual environment representative of a physical environment containing a plurality of objects. The virtual environment may be determined from sensor data received from one or more sensors scanning the physical environment. After the robotic device performs an action according to the plan, updated sensor data may be received. Based on the updated sensor data, the plan may be modified in some instances. The robotic device may then perform another action according to the modified plan.

In one example, a method is provided that includes determining a virtual environment by one or more processors based on sensor data received from one or more sensors, the virtual environment representing a physical environment containing a plurality of physical objects. The method may further include developing a plan, based on the virtual environment, to cause a robotic manipulator to move one or more of the physical objects in the physical environment. The method may also include causing the robotic manipulator to perform a first action according to the plan. The method may additionally include receiving updated sensor data from the one or more sensors after the robotic manipulator performs the first action. The method may further include modifying the virtual environment based on the updated sensor data. The method may also include determining one or more modifications to the plan based on the modified virtual environment. The method may additionally include causing the robotic manipulator to perform a second action according to the modified plan.

In a further example, a system including a robotic manipulator, at least one sensor, and a control system is disclosed. The control system may be configured to determine a virtual environment based on sensor data received from the at least one sensor, the virtual environment representing a physical environment containing a plurality of physical objects. The control system may be further configured to develop a plan, based on the virtual environment, to cause the robotic manipulator to move one or more of the physical objects in the physical environment. The control system may also be configured to cause the robotic manipulator to perform a first action according to the plan. The control system may additionally be configured to receive updated sensor data from the one or more sensors after the robotic manipulator performs the first action. The control system may also be configured to modify the virtual environment based on the updated sensor data. The control system may further be configured to determine one or more modifications to the plan based on the modified virtual environment. The control system may additionally be configured to cause the robotic manipulator to perform a second action according to the modified plan.

In another example, a non-transitory computer readable medium having stored therein instructions, that when executed by a computing system, cause the computing system to perform functions is disclosed. The functions may include determining a virtual environment by one or more processors based on sensor data received from one or more sensors, the virtual environment representing a physical environment containing a plurality of physical objects. The functions may further include developing a plan, based on the virtual environment, to cause a robotic manipulator to move one or more of the physical objects in the physical environment. The functions may also include causing the robotic manipulator to perform a first action according to the plan. The functions may additionally include receiving updated sensor data from the one or more sensors after the robotic manipulator performs the first action. The functions may further include modifying the virtual environment based on the updated sensor data. The functions may also include determining one or more modifications to the plan based on the modified virtual environment. The functions may additionally include causing the robotic manipulator to perform a second action according to the modified plan.

In yet another example, a system may include means for determining a virtual environment by one or more processors based on sensor data received from one or more sensors, the virtual environment representing a physical environment containing a plurality of physical objects. The method may further include means for developing a plan, based on the virtual environment, to cause a robotic manipulator to move one or more of the physical objects in the physical environment. The method may also include means for causing the robotic manipulator to perform a first action according to the plan. The method may additionally include means for receiving updated sensor data from the one or more sensors after the robotic manipulator performs the first action. The method may further include means for modifying the virtual environment based on the updated sensor data. The method may also include means for determining one or more modifications to the plan based on the modified virtual environment. The method may additionally include means for causing the robotic manipulator to perform a second action according to the modified plan.

The foregoing summary is illustrative only and is not intended to be in any way limiting. In addition to the illustrative aspects, embodiments, and features described above, further aspects, embodiments, and features will become apparent by reference to the figures and the following detailed description and the accompanying drawings.

BRIEF DESCRIPTION OF THE DRAWINGS

FIG. 3A shows a stack of boxes resulting from the movement in FIG. 2C, according to an example embodiment.

DETAILED DESCRIPTION

Figure 1A:
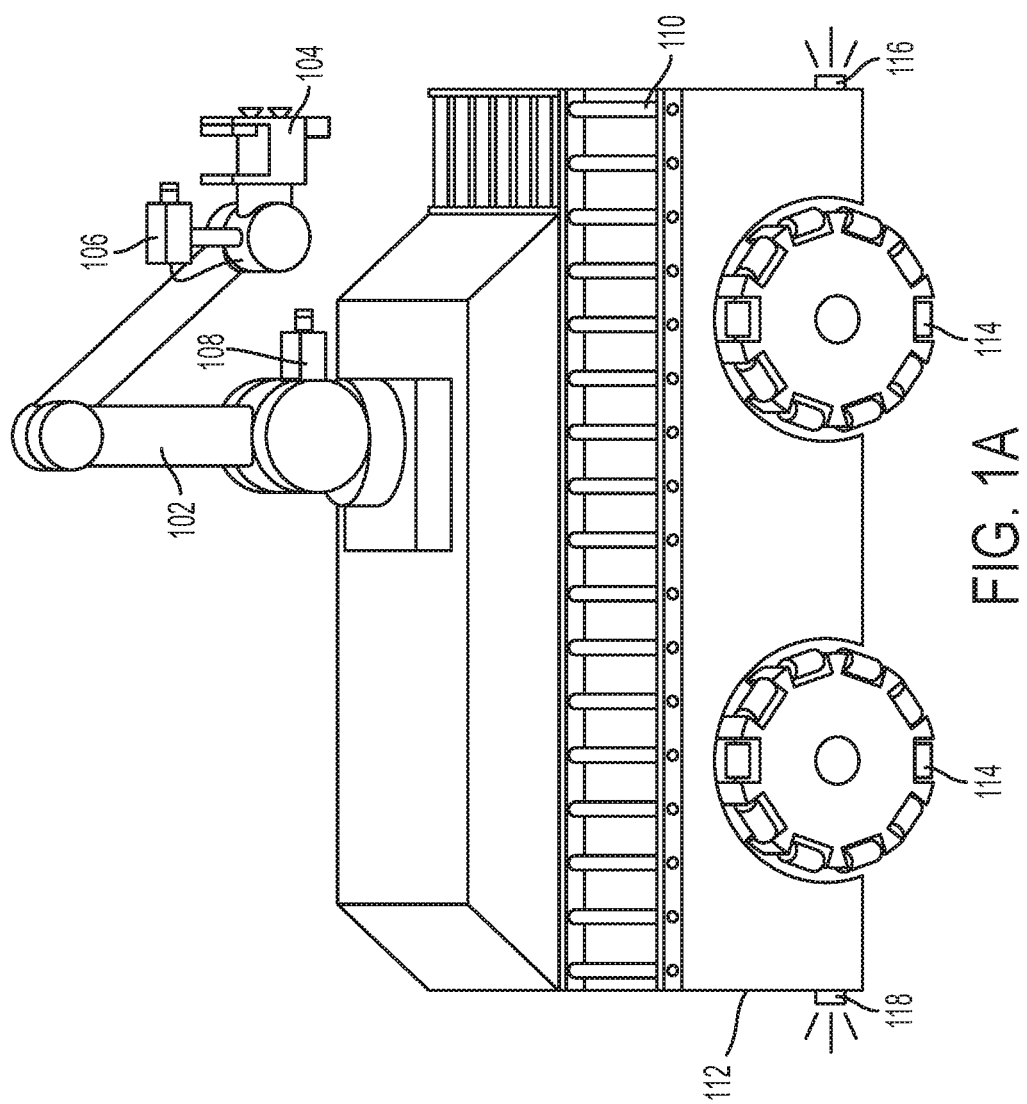
FIG. 1A shows a robotic arm mounted on a moveable cart, according to an example embodiment.

Example methods and systems are described herein. Any example embodiment or feature described herein is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the Figures should not be viewed as limiting. It should be understood that other embodiments might include more or less of each element shown in a given Figure. Further, some of the illustrated elements may be combined or omitted. Yet further, an example embodiment may include elements that are not illustrated in the Figures.

Example embodiments provide for systems and methods that allow a robotic device to move objects within an environment, such as to load or unload boxes or to construct or deconstruct pallets (e.g., from a container or truck bed). Initially, a 2D or 3D virtual environment or model may be constructed based on sensor data from a physical environment containing physical objects (e.g., a stack of boxes). From that model, a control system may determine a plan for moving some of the objects (e.g., loading or unloading boxes) using a robotic device. For instance, the plan may identify a first box or several boxes for the robotic device to move to a drop-off location using a robotic arm with a gripper.

In some cases, after the process has begun and one or more objects have been moved, the environment may have changed such that the original model may no longer be valid. For instance, new information may be learned about objects underneath a box after the box has been moved. In other examples, one or more objects may have changed position in an unpredicted manner after a certain object was moved by the robot. In such cases, actions dictated by the current plan based on the current model may no longer be feasible or desirable. Thus, in some examples, part or all of the environment may be scanned again and a revised 3D model may be reconstructed. From the newly reconstructed model, the plan for moving objects may be modified accordingly in order to take into account changes in the physical environment that were unaccounted for in the original model and plan.

In some embodiments, one or more 2D or 3D sensors may continually capture image scans of the environment for reconstruction of the environment in real time. The sensors may be mounted on a moving robotic arm, on a moveable cart on which the robotic arm is mounted, and/or at one or more fixed locations within the environment. In other examples, the system may rescan periodically with one or more sensors after a certain period of time has passed. In additional examples, the system may be configured to rescan a portion or all of the environment after a specified event, such as a box pick up by the robotic device. In the example of a box pick up, a new scan may be taken of the area where the box was located (e.g., to detect objects or portions of objects that were previously obscured by the box). Additionally, a new scan may also be taken from the view where the box was located as well or instead by moving a camera mounted on the robotic device into the space. Other types of events may also be used to trigger a scan as well. In examples where the robotic arm is mounted on a moveable cart, the cart may be moved into areas vacated by moved objects in order to collect additional sensor data and/or reach additional objects.

In one example implementation of the continuous import model, a robotic device (e.g. a device containing a robotic arm and an end effector for picking up objects) may be used to unload a truck. The robot may first capture a 3D model or a 2D facade (e.g., a 2D depth map of distances of objects from a horizontal or vertical plane) of the environment and input the model or facade into a planning simulator. The virtual environment may indicate particular geometric shapes and/or sizes of objects within the environment. In some cases, the virtual environment may also contain a representation of projected motion paths of moving objects, such as when the objects are moving on a conveyor belt.

In further examples, a scan may be triggered based on a determination that a current representation of a particular area of the environment needs refinement. For instance, a scan of a specific area with a coarse representation may be triggered in order to receive sensor data to determine a finer representation of the area. In some examples, a particular geometric shape in the coarse representation could lead to an object hypothesis indicating a possible shape of an object within the environment. Further scans of the object or possible object may then be triggered in order to verify or disprove the hypothesis.

The simulator may plan a first action for the robot based on the inputted model of the environment and then the robot arm may perform the action. After every action by the robot (e.g., unloading a box), the system may recapture sensor data to update portions or all of the 2D facade or 3D model (as needed by a 2D or 3D simulator respectively). In some examples, this recaptured model may be determined based in whole or in part on sensor data captured by one or more sensors located on the robot arm which capture sensor data as the robot arm moves through the physical environment. This recaptured model may then be input into the planning simulator so that the next action for the robot may be determined by the planning simulator using the actual facade or pallet pile result within the physical environment, not a simulated result.

Within examples, continuous import of 3D models provides many possible advantages. One possible advantage is that continual recapturing may eliminate accumulation of structural errors in planning. Another possible advantage is that actual problems occurring during the loading/unloading process can be identified, measured, and corrected. Another possible advantage is that continuous import may allow for multiple robot arms to collaborate in packing a truck or pallet more quickly. Additionally, using continuous import, a plan can be executed in order to load objects into a stack or pallet with particular characteristics, such as density or stability. For instance, boxes may be loaded into a stack in order to minimize an amount of air gaps between boxes. As another example, boxes may be loaded into a stack containing interlaced columns of objects (e.g., columns with levels that contains portions of multiple different objects). In further examples, other target characteristics for stacks or groups of loaded objects may be achieved as well.

Reference will now be made in detail to various embodiments, examples of which are illustrated in the accompanying drawings. In the following detailed description, numerous specific details are set forth in order to provide a thorough understanding of the present disclosure and the described embodiments. However, the present disclosure may be practiced without these specific details. In other instances, well-known methods, procedures, components, and circuits have not been described in detail so as not to unnecessarily obscure aspects of the embodiments.

According to various embodiments, described herein are methods and systems for automated loading and/or unloading of boxes and/or other objects, such as into a storage container or from a vehicle. In some example embodiments, boxes or objects may be automatically organized and placed onto pallets. Within examples, automating the process of loading/unloading trucks and/or the process of creating pallets from objects for easier storage and transport may provide a number of industrial and business advantages.

According to various embodiments, automating the process of loading/unloading trucks and/or the process of creating pallets may include the incorporation of one or more robotic devices to move objects or perform other functions. In some embodiments, a robotic device can be made mobile by coupling with a wheeled base, a holonomic base (e.g., a base that can move in any direction), or rails on the ceiling, walls or floors. In some embodiments, the base can be an elevated base.

In some examples, a system including one or more sensors, one or more computers, and one or more robotic arms is described. The sensors may scan an environment containing one or more objects in order to capture visual data and/or three-dimensional (3D) depth information. Data from the scans may then be integrated into a representation of larger areas in order to provide digital environment reconstruction. In additional examples, the reconstructed environment may then be used for identifying objects to pick up, determining pick positions for objects, and/or planning collision-free trajectories for the one or more robotic arms and/or a mobile base.

As used herein, the term "boxes" will refer to any object or item that can be placed onto a pallet or loaded onto or unloaded from a truck or container. For example, in addition to rectangular solids, "boxes" can refer to cans, drums, tires or any other "simple" shaped geometric items. Additionally, "loading" and "unloading" can each be used to imply the other. For example, if an example describes a method for loading a truck, it is to be understood that substantially the same method can also be used for unloading the truck as well. As used herein, "palletizing" refers to loading boxes onto a pallet and stacking or arranging the boxes in a way such that the boxes on the pallet can be stored or transported on the pallet. In addition, the terms "palletizing" and "depalletizing" can each be used to imply the other.

According to various embodiments, a robotic manipulator may be mounted on a holonomic cart (e.g., a cart with wheels that allow the cart to move in any direction). FIG. 1A depicts an exemplary holonomic cart containing a robotic manipulator. In some embodiments, a moveable cart 112 may include a robotic arm 102 mounted on the cart 112. The robotic arm 102 may contain a gripping component 104 for gripping objects within the environment. The cart may contain one or more wheels 114, which may be holonomic wheels that operate with two degrees of freedom. In further embodiments, a wrap around front conveyor belt 110 may be included on the holonomic cart 112. In some examples, the wrap around front conveyer belt may allow the robot to not have to rotate its gripper to the left or right when unloading or loading boxes from or to a truck container or pallet.

In other examples, the robotic manipulator may be mounted on a different type of movable apparatus or may not be mounted on a movable base at all. For example, the robotic manipulator may be mounted at a fixed position within a factory setting. In other example embodiments, one or more robotic manipulators may be mounted on rails of a truck or container. In such examples, the robotic manipulators may be used to load or unload the truck or container.

Figure 1B:
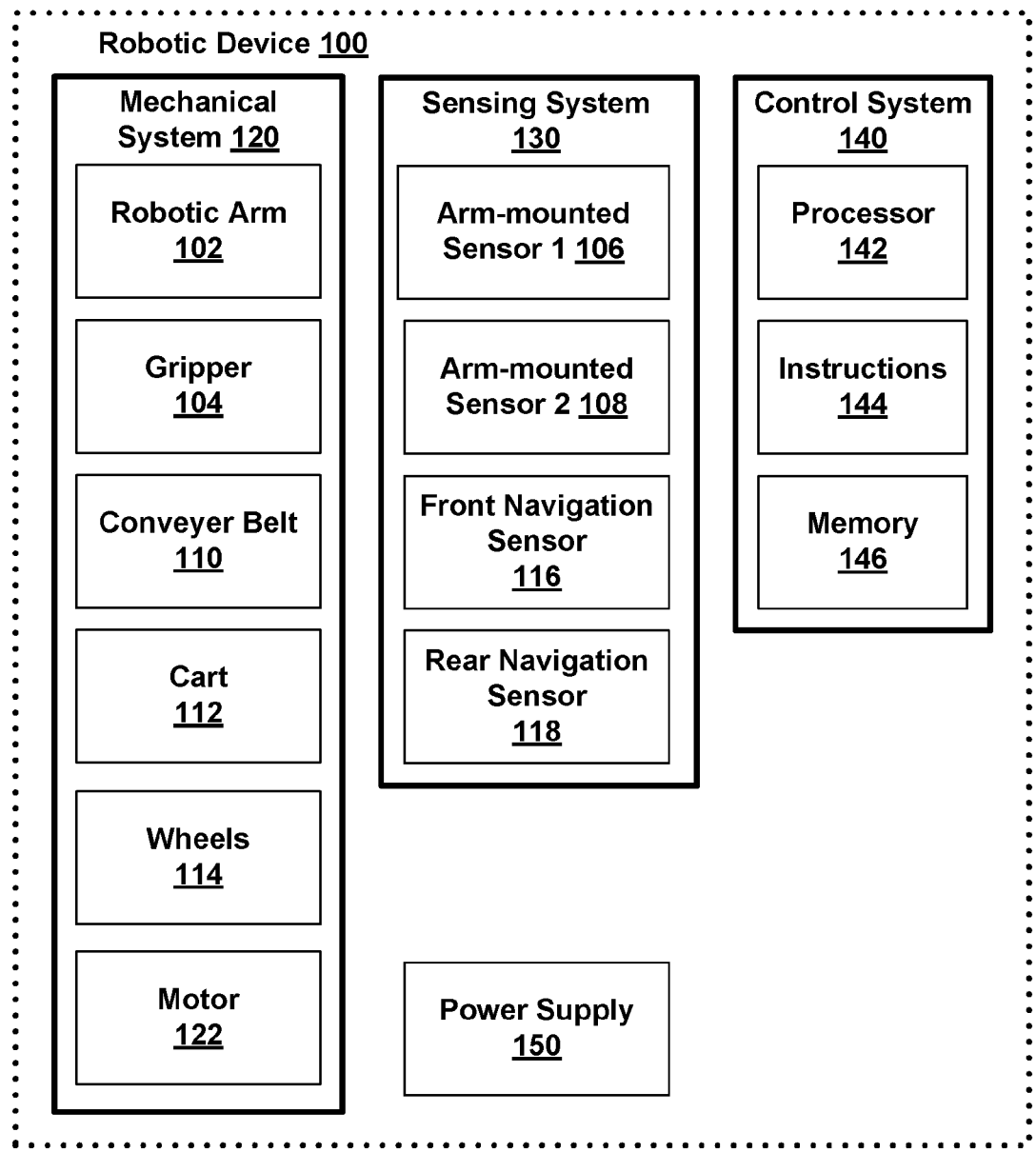
FIG. 1B is a functional block diagram illustrating a robotic device, according to an example embodiment.

FIG. 1B is a functional block diagram illustrating a robotic device 100, according to an example embodiment. The robotic device 100 could include various subsystems such as a mechanical system 120, a sensing system 130, a control system 140, as well as a power supply 150. The robotic device 100 may include more or fewer subsystems and each subsystem could include multiple elements. Further, each of the subsystems and elements of robotic device 100 could be interconnected. Thus, one or more of the described functions of the robotic device 100 may be divided up into additional functional or physical components, or combined into fewer functional or physical components. In some further examples, additional functional and/or physical components may be added to the examples illustrated by FIGS. 1A and 1B.

The mechanical system 120 may include components described above with respect to FIG. 1A, including a robotic arm 102, a gripper 104, a conveyer belt 110, a (movable or holonomic) cart 112, and one or more wheels 114. The mechanical system 120 may additionally include a motor 122, which may be an electric motor powered by electrical power, or may be powered by a number of different energy sources, such as a gas-based fuel or solar power. Additionally, motor 122 may be configured to receive power from power supply 150. The power supply 150 may provide power to various components of robotic device 100 and could represent, for example, a rechargeable lithium-ion or lead-acid battery. In an example embodiment, one or more banks of such batteries could be configured to provide electrical power. Other power supply materials and types are also possible.

The sensing system 130 may use one or more sensors attached to a robotic arm 102, such as sensor 106 and sensor 108, which may be 2D sensors and/or 3D depth sensors that sense information about the environment as the robotic arm 102 moves. The sensing system may determine information about the environment that can be used by control system 140 (e.g., a computer running motion planning software) to pick and move boxes efficiently. The control system 140 could be located on the device or could be in remote communication with the device. In further examples, scans from one or more 2D or 3D sensors with fixed mounts on a mobile base, such as a front navigation sensor 116 and a rear navigation sensor 118, and one or more sensors mounted on a robotic arm, such as sensor 106 and sensor 108, may be integrated to build up a digital model of the environment, including the sides, floor, ceiling, and/or front wall of a truck or other container. Using this information, the control system 140 may cause the mobile base to navigate into a position for unloading or loading.

In additional examples, planar surface information may be extracted from 3D sensors to model walls, floor and/or box faces. After modeling the floor, projection of objects onto the floor plane may enable segmentation of obstacles and/or target objects such as boxes. Floor-plane projection can also be used to model the corrugated sides of a container or truck, which may not be accurately modeled as planes. In further examples, sidewall angles, floor plane roll and pitch, and/or distance from side walls can be used to maneuver a mobile base into a container without collisions. Use of extended 3D information rather than a single line scan may help make the extraction of navigation information robust. For example, the side walls may have a vertical extent that is captured by the 3D sensor. Scanning systems that use a single line of depth information may be slower if they scan vertically and/or less robust because they acquire less information. In additional examples, front plane modeling can determine the distance to a next group of objects to pick in truck unloading.

In further examples, the robotic arm 102 may be equipped with a gripper 104, such as a digital suction grid gripper. In such embodiments, the gripper may include one or more suction valves that can be turned on or off either by remote sensing, or single point distance measurement and/or by detecting whether suction is achieved. In additional examples, the digital suction grid gripper may include an articulated extension. In some embodiments, the potential to actuate suction grippers with rheological fluids or powders may enable extra gripping on objects with high curvatures.

In some embodiments, the gripper could potentially span several boxes or objects and turn on suction for some or all of the covered objects. In some embodiments, the suction or adhesion devices may be a "digital" grid so that the robotic device can turn on any number of the suction devices as will fit boxes sensed for grabbing. In some implementations, the system may notice a seam in the boxes (separation between adjacent boxes) such that suckers can be activated on both sides of the seam to pick up both boxes at once, thereby doubling the throughput. In some embodiments, the suckers can sense after a certain amount time whether they can successfully grip a surface, after which they may automatically shut off. In further embodiments, sections of the suckers can fold down to grasp the top of the boxes. For instance, grippers can initially start at full extension and then conform to the surface being gripped.

In further examples, the robotic arm can implement a wiggle movement to improve a suction grip. In additional embodiments, the robotic arm can wiggle a box side to side to help segment the box from its surroundings. In other embodiments, the arm can wiggle upon pick up of the box to avoid jostling other objects. In such embodiments, when trying to adhere to an object in order to pick it up using suction, the robotic arm may employ a wiggle motion in order to make a firm seal against the object. In further examples, the robotic arm may wiggle the object as the robotic arm is picking up the object so that the box can more gently break friction or overlap contact with other items. This may help avoid a situation where pulling the object up too directly or too quickly causes other items to be tossed into the air.

According to various embodiments, cardboard boxes can have concave, convex or otherwise rumpled faces that make it hard for a suction device to adhere to. Thus, wiggling the suction device as the device makes suction contact may enable a more reliable grip on cardboard boxes and other non-planar objects. In further examples, when first grabbing a box, a few center suction devices can be turned on and the arm can wiggle back and forth as it starts to pull the box out. This may break surface adhesion with other boxes and help to start to pull the box out. Once the box is at least partially pulled out, the box may then be segmented from the other boxes more easily. In some embodiments, wiggling while picking up an object in clutter may remove other objects from the picked up object, thereby preventing unwanted pick up of surrounding objects.

According to various embodiments, segmentation of items may be necessary for successful grasping. In some embodiments, a smooth surface patch may belong to two separate objects. In such instances, manipulator interaction with the objects may be used to perturb the scene to better segment the objects from each other. For motion separation, the natural or forced movement of objects on a conveyor, on a slide, moving in a tote, and/or actively jostled within a tote may be tracked by optical flow, parallax, or time delayed views to calculate stereo depth in order to enhance object segmentation.

In other examples, one or more of the sensors used by a sensing system may be a RGBaD (RGB+active Depth) color or monochrome camera registered to a depth sensing device that uses active vision techniques such as projecting a pattern into a scene to enable depth triangulation between the camera or cameras and the known offset pattern projector. This type of sensor data may help enable robust segmentation. According to various embodiments, cues such as barcodes, texture coherence, color, 3D surface properties, or printed text on the surface may also be used to identify an object and/or find its pose in order to know where and/or how to place the object (e.g., fitting the object into a fixture receptacle). In some embodiments, shadow or texture differences may be employed to segment objects as well.

Many or all of the functions of robotic device 100 could be controlled by control system 140. Control system 140 may include at least one processor 142 (which could include at least one microprocessor) that executes instructions 144 stored in a non-transitory computer readable medium, such as the memory 146. The control system 140 may also represent a plurality of computing devices that may serve to control individual components or subsystems of the robotic device 100 in a distributed fashion.

In some embodiments, memory 146 may contain instructions 144 (e.g., program logic) executable by the processor 142 to execute various functions of robotic device 100, including those described above in connection with FIGS. 1A-1B. Memory 146 may contain additional instructions as well, including instructions to transmit data to, receive data from, interact with, and/or control one or more of the mechanical system 120, the sensor system 130, and/or the control system 140.

Figure 2A:
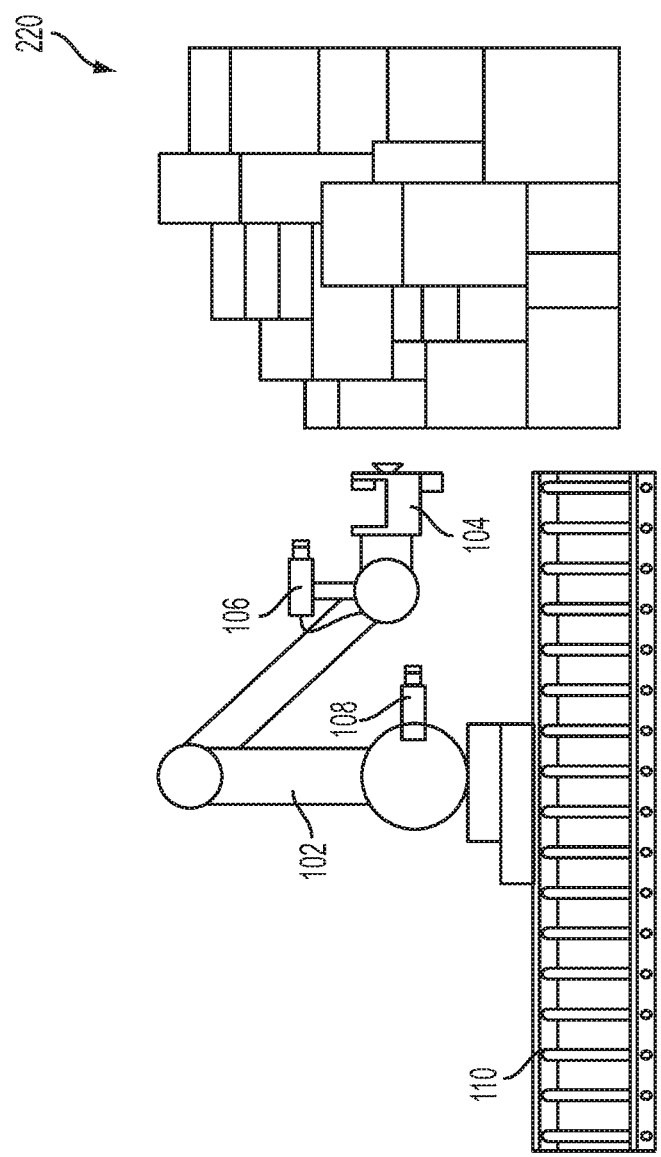
FIG. 2A shows a robotic arm and a stack of boxes, according to an example embodiment.

According to various embodiments, a perception guided robot is described. For instance, a robotic device may utilize a combination of perception together with planning to guide the robot arm to pick up a box and place it where it needs to go. FIG. 2A illustrates part of the robotic device from FIG. 1A with a stack of boxes, according to an example embodiment. As shown, the robotic device may include a robotic arm 102 with a gripping component 104, sensors 106 and 108, and conveyer 110 as described above. In some examples, the robotic device could be mounted on a holonomic cart as described with respect to FIG. 1A, could be mounted on a different type of movable apparatus, could be mounted on rails or tracks, or could be stationary. The robotic device may be controlled to pick boxes from a stack of boxes 220 containing a heterogenous mix of shapes and sizes of boxes.

Figure 2B:
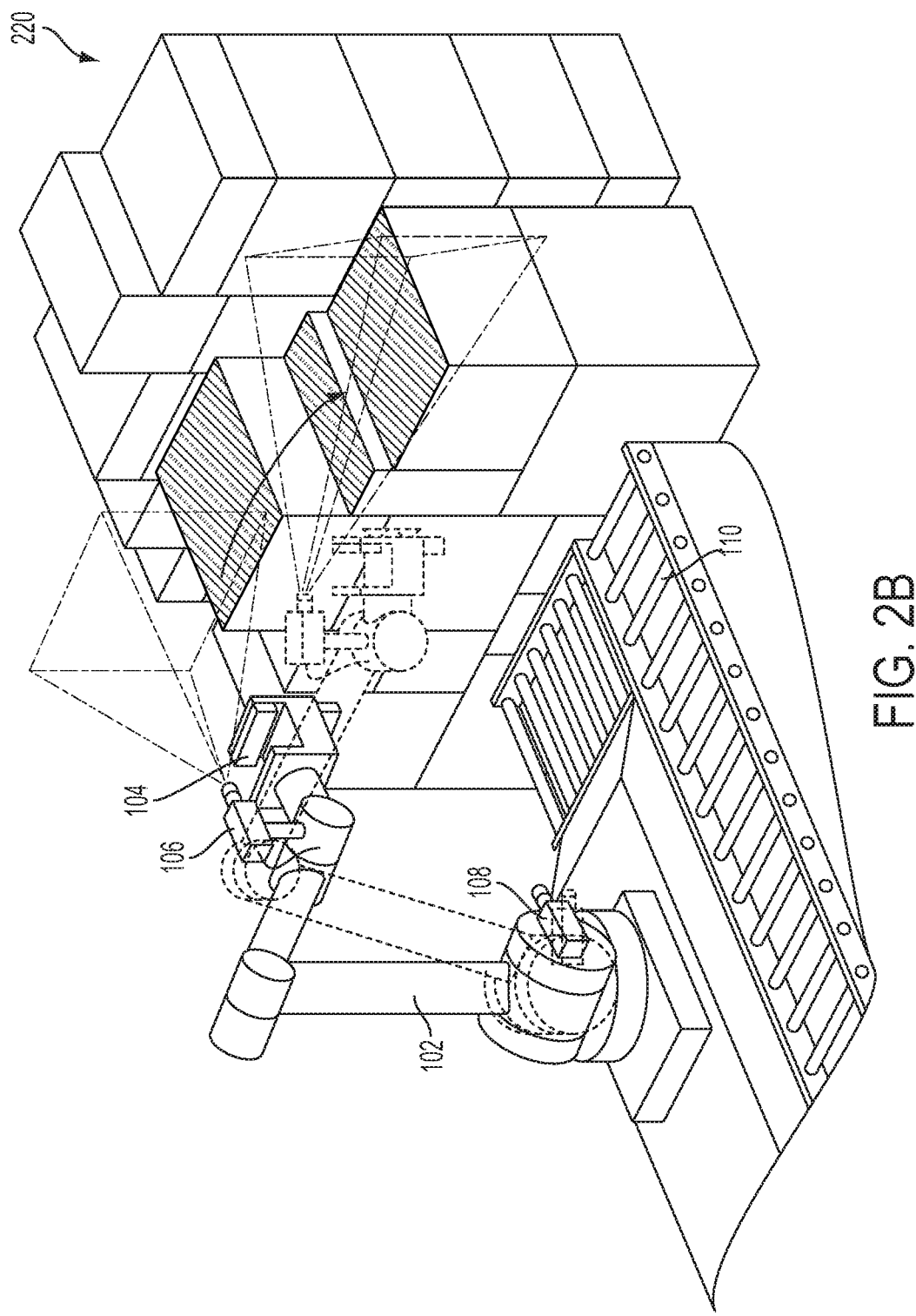
FIG. 2B shows scanning of the stack of boxes from FIG. 2A by a sensor mounted on the robotic arm, according to an example embodiment.

Within examples, a virtual environment including a model of the objects in 2D and/or 3D may be determined and used to develop a plan or strategy for picking up the boxes. In some examples, the robot may use one or more sensors to scan an environment containing objects, as shown in FIG. 2B. As the robotic arm 102 moves, a sensor 106 on the arm may capture sensor data about the stack of boxes 220 in order to determine shapes and/or positions of individual boxes. In additional examples, a larger picture of a 3D environment may be built up by integrating information from individual (e.g., 3D) scans. Sensors performing these scans may be placed in fixed positions, on a robotic arm, and/or in other locations. According to various embodiments, scans may be constructed and used in accordance with any or all of a number of different techniques.

In some examples, scans can be made by moving a robotic arm upon which one or more 3D sensors are mounted. Feedback from the arm position may provide pose information about where the sensor is positioned and may be used to help with the integration. Alternately, or additionally, scans may be made using one or more 2D sensors, for instance by leveraging motion and tracking keypoints in the environment. In further examples, scans may be from fixed-mount cameras that have fields of view (FOVs) covering a given field. In additional examples, scans may be visually registered to help with fine pose estimation, potentially giving better integration results.

In further examples, a virtual environment may be built up using a 3D volumetric or surface model to integrate information (e.g., from different sensors). This may allow the system to operate within a larger environment, such as in cases where one sensor may be insufficient to cover a large environment. Such techniques may also increase the level of detail captured, which may help the robotic device perform various tasks. In particular, integrating information can yield finer detail than from a single scan alone (e.g., by bringing down noise levels). This may make possible better object detection, surface picking, or other applications.

In further examples, wide-angle environment reconstruction may be performed by sensing an environment and extracting that information into a simplified geometric model of simple mathematical 3D geometric forms (e.g., planes, cylinders, cones, hemispheres, etc). In some instances, such techniques may make motion planning easier and/or may make violation of the models (e.g., collisions) easier to detect. Alternately, or additionally, such techniques may allow a parametric description to extend the environment. For instance, the ground may be treated as a plane that extends behind objects that occlude it.

In additional examples, planes or other mathematical surfaces in the environment may be extracted in 3D. These known "ideal" surface detections may be combined into a more accurate model of the environment. For instance, planes may be used to determine the full extents of walls (or mathematical description thereof) and other obstacles to avoid collisions and detect where objects of interest are. Also, mathematical representations of objects may be used to look for anomalies such as when person enters into an environment. Such events may violate the ideal model, which may make their detection easier.

In other examples, certain objects such as boxes may have simple planar form. For instance, a metal can may have a geometric form of a cylinder and a tire may have a geometric form of a torus. Example systems may leverage this trait of certain objects in order model them and/or determine how to motion plan for the objects. For instance, known templates of certain shapes can be used to refine detected features of objects within the environment that appear to match a particular shape.

In some examples, 2D and 3D information may be represented at least in part via one or more facades. A facade may be defined as a near-planar construct containing a set of objects, represented as a depth map (e.g., a 2D map of distances as the third dimension). Examples of facades may include the wall of boxes in a truck, the top of a pallet stack containing boxes or other objects, or the top of a bin of jumbled objects.

Figure 2C:
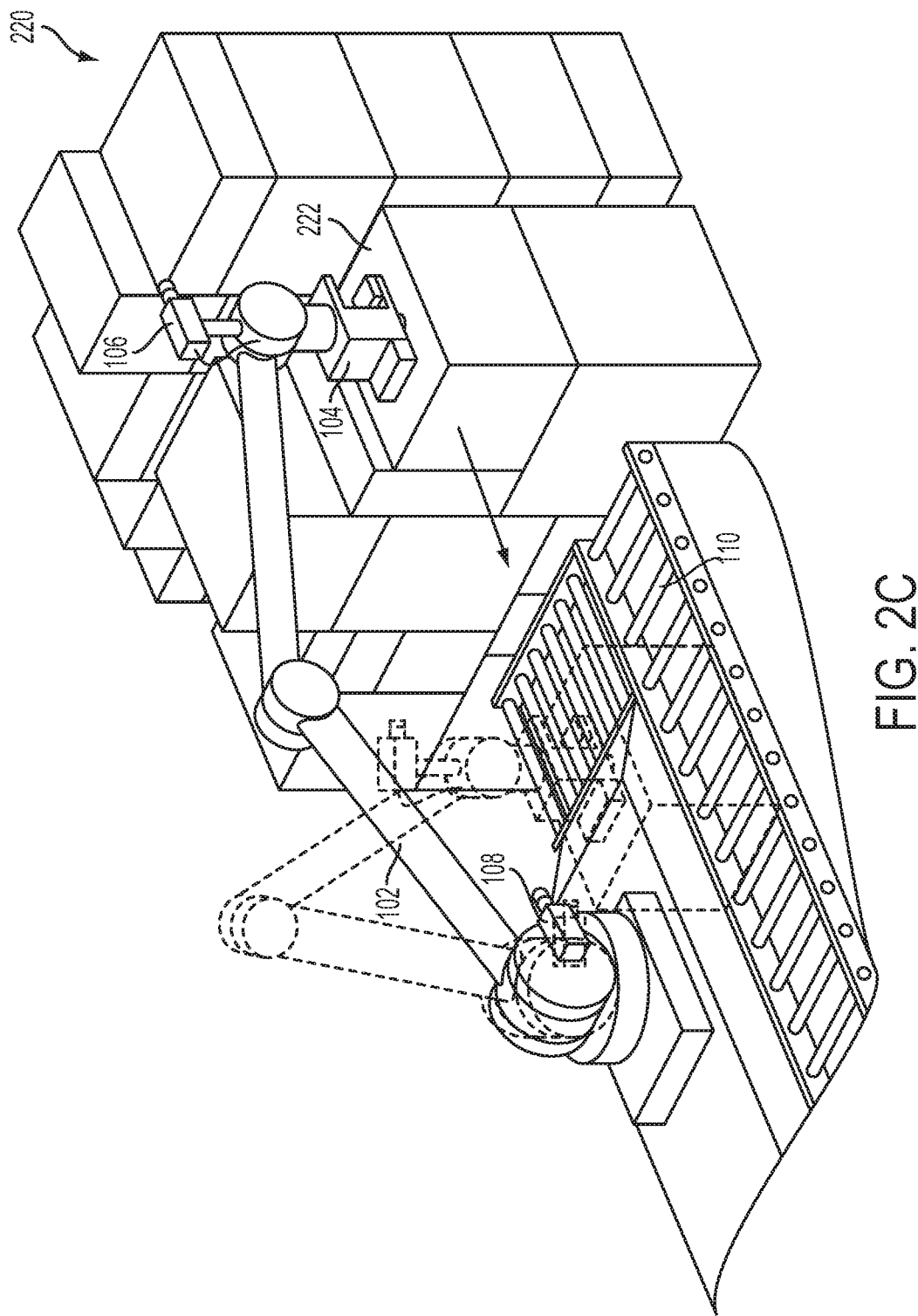
FIG. 2C shows the robotic arm from FIG. 2A moving a box, according to an example embodiment.

In further examples, a facade may be constructed from boxes, for instance to plan in what order the boxes should be picked up. For instance, as shown in FIG. 2C, box 222 may be identified by the robotic device as the next box to pick up. Box 222 may be identified within a facade representing a front wall of the stack of boxes 220 constructed based on sensor data collected by one or more sensors, such as sensor 106 and 108. A control system may then determine that box 222 is the next box to pick, possibly based on its shape and size, its position on top of the stack of boxes 220, and/or based on characteristics of a target container or location for the boxes. The robotic arm 102 may then be controlled to pick up the box 222 using gripper 104 and place the box 222 onto the conveyer belt 110 (e.g., to transport box 222 into a storage area).

In additional examples, a facade may be represented as an orthographic projection of 3D surface information. This representation may allow for parsing the facade to determine interesting areas for a particular application. For example, in truck unloading, the upper left corner of the next box to pick may be determined based on a facade representation. In other examples, an orthographic projection of integrated 3D environment may be determined to give a wide-FOV, easily-parsed representation for performing application-related tasks. One such task may be finding the corner or corners (e.g., top left) of a box to pick. Another such task may involve finding good surfaces (e.g., relatively flat and large) for picking objects out of a bin.

In further examples, a 3D model of a stack of boxes may be constructed and used as a model to help plan and track progress for loading/unloading boxes to/from a stack or pallet. Any one actual camera view of the facade may suffer from point of view occlusions and perspective distortion. Accordingly, multiple RGBD views via robot arm movements and/or different views from a cart base or fixed locations may be combine to create a single facade of the boxes to be picked.

In other examples, the 3D model may be used for collision avoidance. Within examples, planning a collision-free trajectory may involve determining the 3D location of objects and surfaces in the environment. A trajectory optimizer may make use of the 3D information provided by environment reconstruction to optimize paths in the presence of obstacles. In further examples, the optimizer may work in real time and may accept many kinds of constraints. As an example of such a constraint, the optimizer may attempt to keep the end effector level throughout the trajectory.

In additional examples, an environment may be captured as a mesh or set of 3D points. A robot arm may be represented as a convex hull of plane segments for quick collision checking. Constant or frequent updating of the environment may allow the robot arm to quickly respond to changes. In further examples, an optimizer may perform frequent continuous collision checking throughout its path. An optimizer may accept arbitrary constraints in the form of costs, such as to keep a certain distance away from objects or to approach a goal position from a given angle. Additionally, an optimizer may avoid robot fault conditions by working in joint space, keeping track of windup and choosing goal positions from among multiple inverse kinematics solutions. One strategy for motion planning may involve looking ahead several moves to see if the chosen goal joint position will be acceptable for the next move.

In some embodiments, path constraints, such as collision avoidance for robotic arms, cameras, cables, and/or other components, may be put in a constraint based planning solver and solved for to yield a best path to move the arm for perception. Additionally, in some embodiments, the solver may determine a best path for picking up, moving, and placing an object.

According to various embodiments, 3D and/or visual sensors may be calibrated to determine their pose with respect to the workspace. In the case of fixed sensors, the calibration may determine their fixed pose in the workspace. In the case of a sensor on the arm, calibration may determine the offset pose of the sensor from the arm link to which it is attached.

Within examples, calibration techniques may allow for the calibration of an arbitrary number of sensors in the workspace. Calibration may involve determining some or all of a variety of parameters and coefficients. For example, calibration may solve for one or more intrinsic parameters such as focal length and image center. As another example, calibration may determine one or more distortion coefficients such as models of radial and tangential distortion. As yet another example, calibration may solve for one or more extrinsic parameters, where the object is in a scene relative to a pattern or other sensors that identified the same pattern in a scene.

In some examples, calibration may be performed at least in part by using a calibration pattern, which may be a known set of features in 2D or 3D. For instance, a known pattern of dots may be used, where the distance between each dot and the other dots is known. Calibration may be performed at least in part by collecting multiple different views of an object. In further examples, capturing multiple views of a calibration pattern in different positions may allow for (1) calibration of the one or more coefficients of the camera and/or (2) knowledge of where the camera is relative to the coordinate system established by where the calibration pattern was fixed. In particular embodiments, a camera in the scene may identify a calibration pattern on the robot arm while a camera on the arm identifies a calibration pattern in the scene simultaneously.

In additional examples, calibration may involve a camera fixed in a scene. In this case, a calibration pattern may be placed on a robotic arm. The robotic arm may be configured to move through the scene as multiple views of the calibration pattern on the robotic arm are collected. This may help to calibrate the camera and/or be useful for relating the coordinate system of the camera to that of the robot. Further, the relation of each device to the other can be determined by each device as the robotic arm moves.

In certain examples, calibration may involve a camera located on a robotic arm. A calibration pattern may be mounted on a wall or table. Then, the camera may be moved around, collecting multiple views of the calibration pattern from different robot or robotic arm positions. When different 3D or 2D views (e.g., 2, 20, 200) are collected, these views can be used to solve for the calibration relationships. After calibration, when the camera on the arm moves, the system can determine where it is relative to the coordinate system set based on the location of the calibration pattern in the scene. In particular embodiments, both the calibration pattern and the camera may be movable. For example, the calibration pattern may be located on a conveyor belt where the robotic arm may be configured to place boxes. After calibration, the system may determine where the camera was relative to that spot on the conveyor belt.

In further examples, nonlinear optimization may be performed in a two-stage process for robust estimation of 3D sensor calibration. In one stage, an initialization may be derived from the relative pose offsets of the target and the sensors. In another stage, given the initialization, a batch bundle adjustment may be used to find the optimal pose of the cameras together with the target points. Calibration can be extended to the estimation of robot parameters such as joint lengths and joint angle offsets.

In other examples, known, precise, robot motion of the camera over a calibration pattern, or a calibration pattern over a camera may be used to improve calibration results. For instance, information about precisely how the camera moves may be used to obtain more accurate camera calibration. That is, if the camera is moved 50 mm right, the corresponding (perspective projection) amount of movement from the calibration object may be detected. This information may be used to jointly or separately optimize the calibration and tracking parameters.

In additional examples, a robot can look at its ongoing calibration and move in such a way as to maximize information for better calibration. For example, it can detect that some view areas have not been seen and go to those views.

In some systems, calibration techniques may allow for calibration of grippers or other tools positioned at the end of a robotic device, such as the end effector of a robotic arm. These tools may include, for example, welding irons, screwdrivers, glue guns, tiny paint brushes, and drills, among other possibilities. In some examples, accuracy may be required for processes involving these tools (e.g., surgery). Example systems may be calibrated in order to localize where the tip of the tool is, including applications where repeated use of the tool or accidental collisions between the tool and another object can cause the tip to be dislodged, bent, or otherwise manipulated.

An example calibration routine may involve having a robotic arm with the tooltip attached move the tooltip through a beam of light, such as a laser beam. And, a computing device may be configured to measure deviations/displacements of the tooltip from the laser beam as the tooltip is moved along a predetermined path. Based on this measured data, the computing device can then calibrate the robotic device to compensate for any potential losses of precision or accuracy. In some examples, particularly those involving tools with complex three-dimensional shapes, it may be difficult to achieve a desired level of precision using a laser beam.

In other examples, a tooltip calibration routine may involve use of a computer vision system including a camera, a robotic manipulator (e.g., a robotic arm), a tool coupled to an end of the robotic arm, at least one processor, and data storage comprising instructions executable by the at least one processor to cause the system to perform functions. Such a system may not require any markers (e.g., LED tags) on the tool tip. The functions performed by the system may include the robotic manipulator moving the tooltip of the tool to a designated area in a field of view in front of the camera. The camera may be zoomed-in so as to capture images of the tooltip and at least a portion of the rest of the tool and/or the robotic arm.

The robotic arm may then move the tooltip along a predetermined path (e.g., a rotation about a vertical axis) in front of the camera while the camera captures a series of images of the rotating tooltip. From those images, the system may construct a 3D model of the tool, including the tooltip (and likely including a portion of the robotic arm). In some examples, methods for constructing the 3D model of the tool and/or parts of tool may involve use of any of the 3D object reconstruction methods described herein. The system may then determine an offset of the tooltip from where the tooltip is expected to be and/or determine a distance from the tooltip to a reference point on the robotic arm (e.g., the end of the arm where the arm is coupled to the tool).

In some embodiments, a light may be projected onto a diffusion screen in the background of each of the images in order to obtain a better scaled orthographic projection of the tooltip and other portions of the tool and robotic arm placed between the camera and the diffusion screen using silhouettes. In additional embodiments, the calibration process may be automatic and/or may be controlled or turned remotely through a web interface.

In further embodiments, the system may perform image segmentation in order to determine a 3D model of parts including the arm, tool, and/or tooltip. The system may implement certain software executable by the system in order to obtain data about various portions of the arm, tool, and tooltip. In some examples, the camera may be a depth-sensing camera, and the system may obtain geometric data of the tooltip while the tooltip moves along the predetermined path. The system may then use the known robot arm movements and the segmentation of parts to construct a 3D model of the tooltip, tool, and portion of the robotic arm.

In further examples, a system for the practical manipulation of heterogeneous, categorical items, generally from a cluttered collection area to a defined bin, is presented. In some embodiments, the pick location containing the items may not be sensitive to precise object orientation(s) and items may be mixed together. In additional examples, the place location for the items may or may not be sensitive to object orientation. In some examples, the pick-and-place regions may be defined as 3D regions acceptable for picking or placing an object, with some tolerance. The pick-and-place region may be highly cluttered with similar and/or disparate objects. In other embodiments, the items may come from or be put into a fixture, such as metal or plastic snaps that hold the sorted item in a particular orientation.

In additional examples, environment modeling of both the pick-and-place location may be used for intelligent grasp location and motion, as well as event reporting (e.g., when a place region is full or a pick region is empty). In some examples, object bounding volumes may be computed and/or distinguishing features of objects may be found (such as textures, colors, barcodes or OCR). In some embodiments, objects may be sorted into an assigned destination location by matching against a database of location assignments indexed by object type or object ID. For instance, an object's locations may be derived from reading a barcode, considering the size of the object, and/or by recognizing a particular kind of object.

In some examples, a plan for a robotic device may be determined in order to achieve certain configurations of the objects within a target location for the objects. For instance, the goals for loading/unloading or constructing/deconstructing pallets may be to achieve: 1) a dense packing with minimal air gaps in between boxes, and/or 2) a stable packing that won't easily collapse. In some embodiments, stability may require that, in general, heavy objects are on the bottom, and light objects are on top. In other examples, pallets may be created in order to avoid non-interlaced column stacks, column leans, or other characteristics of a bad stack.

In further examples, the pallet or truck/container may be loaded such that work by human operators in subsequent unloading processes is minimized. For instance, in some embodiments, items may be placed in last in, first out order such that, upon unpacking, the items needed first are on top, the items needed second are one layer down and so on. In other examples, the loading of pallets may be independent of how items flow towards the packing cells. Thus, according to some embodiments, the system can handle packages sent in random order or in an order known in advance. In addition, in some embodiments, systems may adapt to changes in the flow of items on the fly. In further examples, one or more boxes may be recorded and buffered by holding the boxes in a temporary storage area where their order can be changed along the way.

According to various embodiments, a 2D simulator and/or a 3D simulator may be utilized for truck or container loading/unloading or for pallet loading/unloading. In some examples, the state of a stack of boxes may be captured in the physical world and input into the simulator. In some embodiments, a variable size queue of boxes from one to all the boxes may be used by a simulator for finding a next box to pick. For example, a queue of 2 boxes or 4 boxes or 10 boxes may be considered by a simulator.

In further examples, the simulator may search over the boxes in the queue to find the best box placement by heuristic algorithms and/or by brute force or multi-resolution search. In some embodiments, the system may increment with increasingly fine placement of boxes around the best sites found in the previously coarser level. In some embodiments, once placement of particular next box has been determined, a physics planner may be used for motion planning in order to move the box efficiently to the determined locations. In further examples, the physical and simulated stacks may be continuously monitored for quality of the stack (e.g., density, stability, and/or order placement). In some examples, the process may be repeated until all the boxes have been placed or the target container can no longer fit in another box.

Figure 3B:
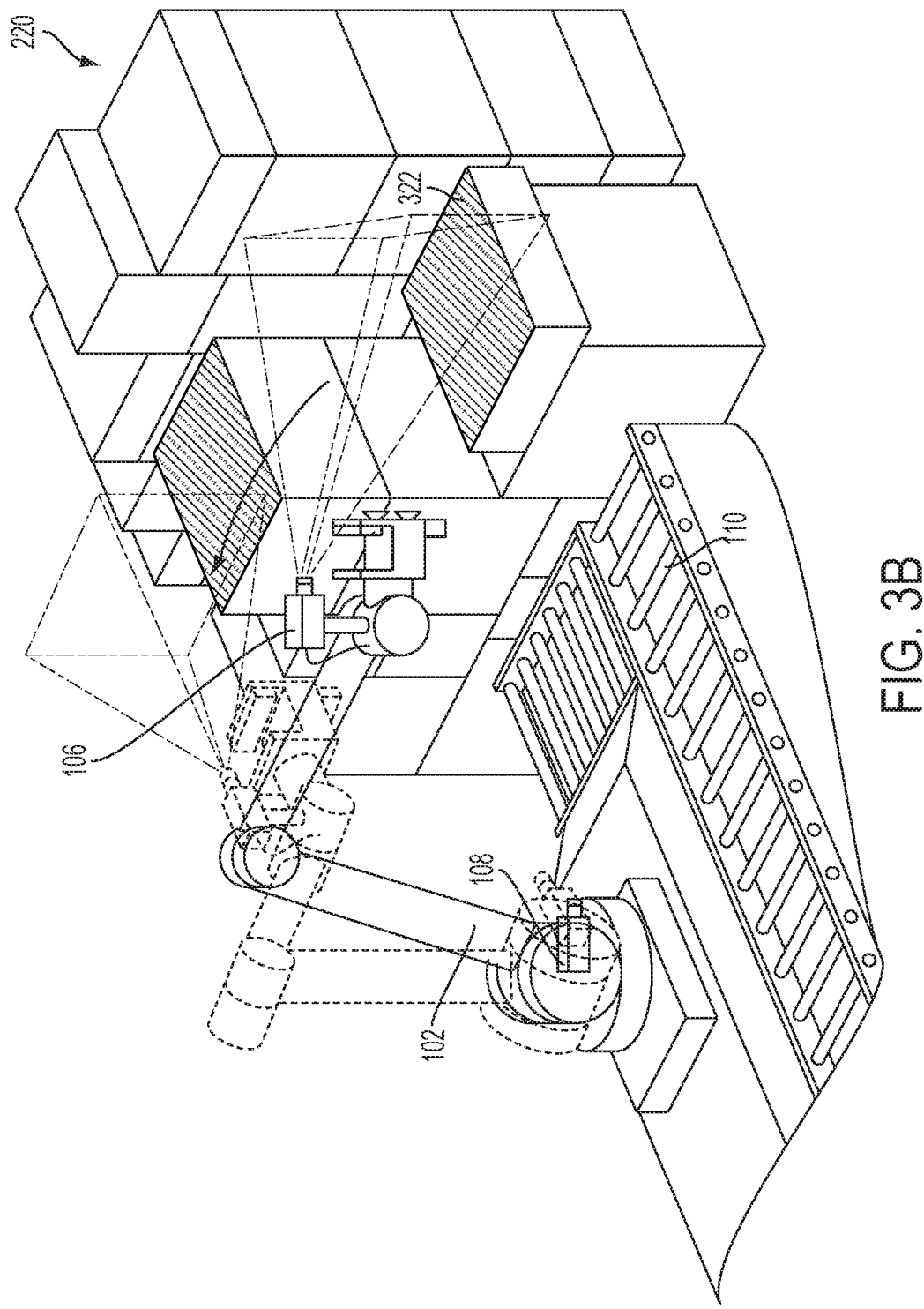
FIG. 3B shows scanning of the stack of boxes from FIG. 3A by a sensor mounted on the robotic arm, according to an example embodiment.
Figure 3C:
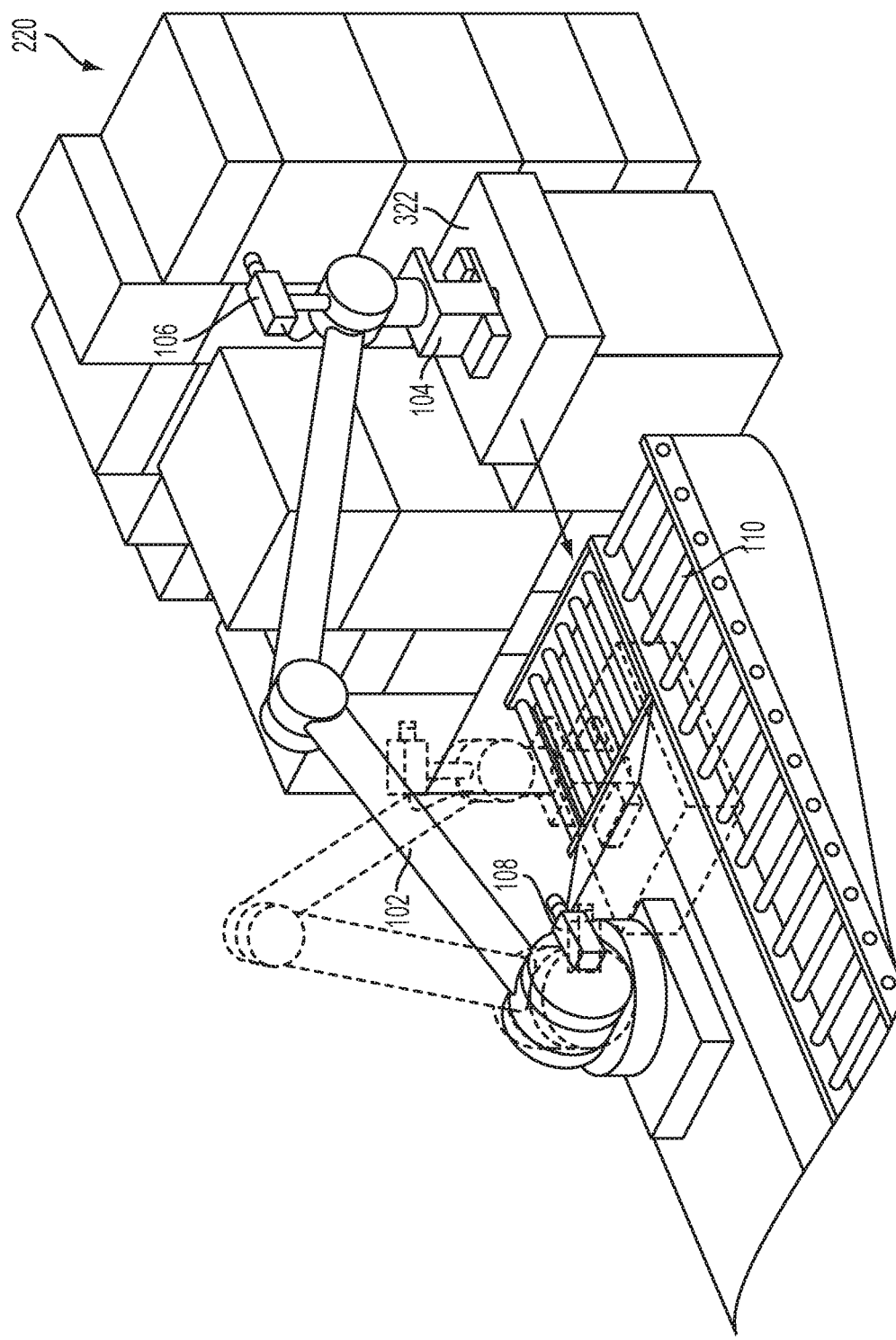
FIG. 3C shows the robotic arm from FIG. 2A moving another box, according to an example embodiment.

FIGS. 3A-3C depict a possible stack of boxes resulting from the movement in FIG. 2C, according to an example embodiment. A method 400 is provided for causing a robotic device to move objects within a physical environment. Method 400 will be discussed in relation to FIGS. 2A-2C and 3A-3C. Method 400 may be carried out using any robotic device described above, such as a device including a robotic arm mounted on a moveable cart with one or more sensors, as illustrated and described with respect to FIGS. 1A-1B. In other examples, method 400 may be carried out using a robotic manipulator mounted on a different type of movable apparatus, on a rail or track, or at a stationary location. In further examples, part or all of method 400 may be performed by one or more control systems located on a robotic device and/or in remote communication with a robotic device. Additionally, while examples with a single robotic arm may be described, various alternative embodiments may include any number of robotic arms, or may include other automated systems integrated with at least one robotic manipulator.

Furthermore, it is noted that the functionality described in connection with the flowcharts described herein can be implemented as special-function and/or configured general-function hardware modules, portions of program code executed by a processor for achieving specific logical functions, determinations, and/or steps described in connection with the flowchart shown in FIG. 4. Where used, program code can be stored on any type of computer-readable medium, for example, such as a storage device including a disk or hard drive.

Figure 4:
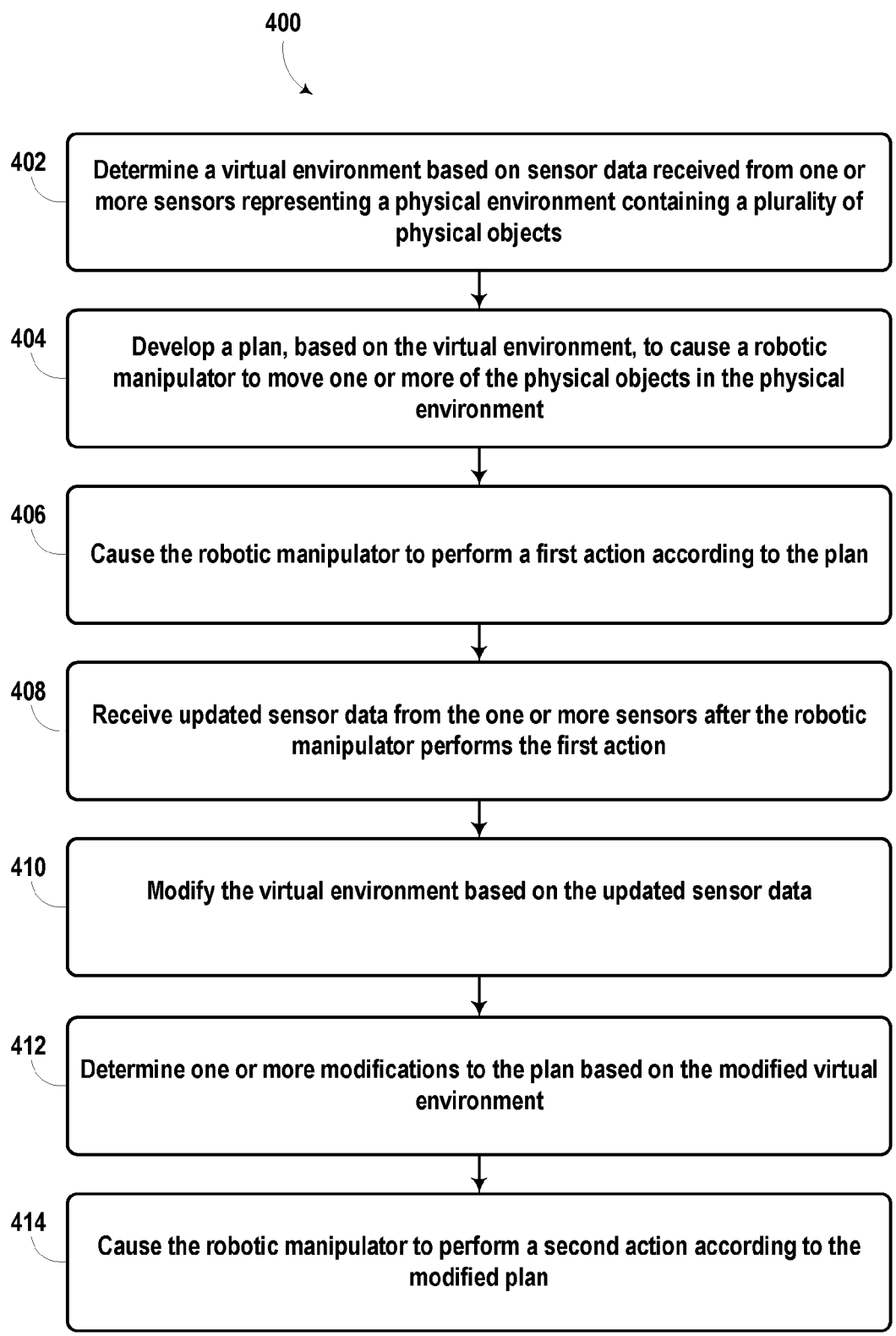
FIG. 4 is a block diagram of a method, according to an example embodiment.

In addition, each block of the flowchart shown in FIG. 4 may represent circuitry that is wired to perform the specific logical functions in the process. Unless specifically indicated, functions in the flowchart shown in FIG. 4 may be executed out of order from that shown or discussed, including substantially concurrent execution of separately described functions, or even in reverse order in some examples, depending on the functionality involved, so long as the overall functionality of the described method is maintained.

As shown by block 402 of FIG. 4, method 400 may initially involve determining a virtual environment representing a physical environment containing a plurality of physical objects. The physical environment may be any of the types of environments containing movable objects described above, such as a bin of heterogeneous parts, a stack of boxes, or a conveyer belt containing moving objects. The virtual environment may contain a 2D and/or 3D representation of the physical environment using any of the types of models or virtual representations described above. In particular, the virtual environment may contain information relating to geometric shapes and/or sizes of objects.

In some examples, a facade may be captured of a near-planar group of objects to be moved, such as the front surface or top surface of a stack of boxes. In further examples, the facade may be stored as a 2D depth map containing information about the distance from each of the objects to a plane aligned with the objects. Within examples, the facade may be used to determine which box to pick first. For instance, a box which does not have boxes on top of it may be selected so that picking the box will not disturb the facade. Other criteria may be applied as well or instead, such as determining a box with a free side or a box which is higher than neighboring boxes by a certain amount.

In additional examples, as described above, the virtual environment may be determined from sensor scans of portions of the environment using sensors located on a robotic manipulator, on a cart supporting the robotic manipulator, and/or at other fixed or movable locations within the environment. For instance, a robotic arm may move through the environment in order to allow a camera (e.g., a 3D depth sensor) to scan a group of object such as a stack of boxes as illustrated and described above with respect to FIG. 2B. In some examples, the robotic arm may be programmed to move along certain motion paths (e.g., arcs or zigzags) in order to collect sensor data using one or more sensors mounted on the robotic arm. In further examples, scans from multiple sensors may be combined in order to create a single virtual representation of the environment. In some examples, the process of receiving sensor data from the one or more sensors and determining a virtual representation may be performed by a control system of a robotic device and/or by a remote control system.

As shown by block 404 of FIG. 4, method 400 may further include developing a plan to cause a robotic manipulator to move one of the objects. The robotic manipulator may be any robotic component capable of moving objects, such as a robotic arm with a gripper component as illustrated and described above with respect to FIGS. 1A-1B and FIGS. 2A-2C. The plan may indicate robot actions, possibly including movements, collection of sensor data, picking up objects, moving objects, and/or placing objects in order to accomplish any of the objectives described above. For instance, the plan may indicate an ordering of boxes to pick in order to unload a truck, an order of robot actions in order to construct a stack of objects, or placement locations in order to fill a container with objects. In some examples, the plan may indicate a certain number of actions in advance for the robot (e.g., the next five boxes to pick). In other examples, the plan may indicate fewer or more robot actions in advance. In additional examples, the plan may be derived from any of the planning simulators described previously.

In some examples, the plan may indicate an ordering of at least some of the objects for the robotic device to use in order to move, load, or unload objects based on or more criteria. For instance, an ordering of robot actions may be chosen in order to minimize an amount of time per robot operations. In other examples, an ordering of robot actions may be chosen in order to maximize throughput (e.g., number of boxes picked). In further examples, an ordering of robot actions may be chosen in order to maximize stability of loaded objects (e.g., to prevent a stack of objects from toppling). In additional examples, an ordering of robot actions may be chosen in order to increase feasibility of current or future objects movements (e.g., by not picking a box supporting another box or by not choosing a motion path which cannot be safely executed).

As shown by block 406 of FIG. 4, method 400 may further involve causing the robotic manipulator to perform a first action according to the plan. The action may be any of the robot actions described previously, including moving a robot arm in order to scan a portion of the environment, picking up an object, placing an object, pushing an object or otherwise moving an object. For example, based on the plan, a robotic arm may be controlled to pick up a particular box from a stack of boxes as illustrated and described previously with respect to FIG. 2C. In other examples, multiple robot commands may be included within a single action. For instance, the first action may cause the robotic arm to move to a box within a stack of boxes, grip the box, pick up the box, move the box to a conveyer belt, and drop off the box. Other combinations of robot commands may be included within an action according to the plan as well.

FIG. 3A shows a stack of boxes resulting from the movement in FIG. 2C, according to an example embodiment. In some cases, one or more unpredicted events may occur during or after a robot action is performed. For instance, after box 222 was moved from the stack of boxes 220 onto the conveyer belt 110 by robotic arm 102, another box 322 may tip over into the area vacated by box 222. In other examples, other types of unpredicted events may occur. For instance, one or more objects may get nudged or pushed by a moving object or by the robotic arm. Additionally, in some cases, one or more objects may not have been moved as intended by the plan. For instance, the robotic arm 102 may fail to grip an object or may fail to place an object in an intended target location.

As shown by block 408 of FIG. 4, method 400 may additionally involve receiving updated sensor data after the robotic manipulator performs the first action. The updated sensor data may be received from any of the types of sensors using any of the scanning methods previously described and may cover any portion of the physical environment or the entire environment. Additionally, the updated sensor data may include data captured from different viewpoints using one or more movable sensors, such as sensors mounted on a robotic arm.

In some examples, the updated sensor data may be received based on continuous scans of the environment by one or more of the sensors. In other examples, the scans by one or more of the sensors may occur at a certain time interval (e.g., once every five seconds or once every minute). In such examples, multiple sensors may each operate at different time intervals in order to maximize the information received from the scans. In some examples, the intervals may be set so that at least one sensor is always scanning the environment. In additional examples, a particular event, such as a box pick up or box drop off, may trigger a scan by one or more of the sensors. In some examples, the type of event may also dictate where in the environment scans will occur. For instance, after a box pickup, scans may be focused on the area vacated by the box and/or from points of view from within the area vacated by the box. In additional examples, sensor scans may be triggered when a difference between the updated virtual environment (e.g., updated from new scans or measurements) and an expected virtual environment is detected. For instance, a scan may be triggered after a box pick when some object is detected in the location from where the box was picked.

In further examples, one or more sensor scans may be triggered by an unexpected measurement. For instance, according to the virtual environment, a robot arm may be commanded to pick and place a box with expected dimensions from a particular location. If, however, particular sensors are unable to validate the success of the pick, a new sensor scan may be done to try to determine the results of the robot action. In some examples, sensors used to validate a robot action may include vacuum sensors that trigger when a box is held by an end effector of the robot. In other examples, sensors used to validate a robot action may include force torque sensors on an end effector of the robot that are correlated with holding a box. In further examples, sensors used to validate a robot action may include a break beam sensor that is triggered if a box or other object is present when it is placed on a conveyor.

FIG. 3B shows scanning of the stack of boxes from FIG. 3A using a sensor mounted on the robotic arm, according to an example embodiment. In particular, the robotic arm 102 may be controlled in order to move the sensor 106 in order to capture updated sensor data from the environment containing the stack of boxes 220. In some examples, the sensor 106 may be controlled in order to capture data indicative of the area vacated by box 222 after it was removed from the stack of boxes 220. In further examples, a sensor, such as sensor 106, may be moved into the area vacated by box 222 in order to collect sensor data from points of view that may have previously been inaccessible. In yet further examples, if the robotic arm is mounted on a movable cart, the cart may also move into areas vacated by a removed object for additional scanning and/or to move additional objects.

As shown by block 410 of FIG. 4, method 400 may additionally include modifying the virtual environment based on the updated sensor data. For instance, referring to FIG. 3B, the virtual environment may be updated to incorporate information that box 222 was successfully removed from the stack of boxes 220. In some examples, information about unexpected events may be determined based on the sensor scans and incorporated into the virtual environment model of the physical environment. Referring again to FIG. 3B, the virtual environment may also be updated to indicate the new position of box 322 within the stack of boxes 220. This information may not have been included in the prior virtual environment if the tipping over of box 322 was unexpected.

In further examples, the modified virtual environment may also include information about areas of the physical environment that previously could not have been captured by sensors. For instance, after picking up a box from a stack of boxes, the area vacated by the box may be scanned, revealing information about shapes and/or locations of one or more objects located underneath or behind the box. This information may be incorporated into the virtual environment in order to provide a more accurate model of the current state of the physical environment.

As shown by block 412 of FIG. 4, method 400 may additionally include determining one or more modifications to the plan based on the modified virtual environment. In some instances, information may be learned about the current state of objects within the physical environment that may be used to alter the plan for moving objects within the environment. For example, modifications to the plan may be determined based on unexpected events and/or based on learning of information that was previously obscured by objects that may have since been moved. In other instances, scans may instead confirm the prior virtual representation of the environment and/or previously determined robot actions within the plan.

Referring to FIG. 3B, the plan may have previously indicated that a certain box other than box 322 should be the next box moved by the robotic arm 102. This plan action may have been generated using a previous virtual model of the environment (e.g., by using a planning simulator or any of the methods of planning described previously). However, it may now be determined based on the modified virtual environment that box 322 should be the next box moved by the robotic arm 102. For instance, a control system on the robotic device may determine that box 322 is not in a stable position and should be removed from the stack of boxes 220 before moving any other boxes. Accordingly, the plan may be modified in order to indicate a different next action for the robotic arm 102 to take. In other examples, the plan may be modified when the next planned action for the robotic arm is no longer feasible (e.g., when another object obstructs the object that was supposed to be moved next according to the plan).

Method 400 may additionally involve causing the robotic actor to perform a second action according to the modified plan, as shown by block 414 of FIG. 4. For instance the second action may indicate that the robotic arm should pick up a particular box, move the box along a particular path, or place the box in a particular location. The second action may also involve movements of the robotic arm for other purposes, such as to cause a scanner mounted on the robotic arm to scan an area that recently changed within the environment. In cases where the robotic arm is mounted on a movable cart, the second action may also indicate movements of the cart, such as to move the robotic arm into position for scanning a certain area and/or moving objects within a certain area.

FIG. 3C shows the robotic arm from FIG. 2A moving another box, according to an example embodiment. In particular, after detecting that box 322 tipped over after box 222 was removed from the stack of boxes 220, the robotic arm 102 may be controlled to move box 322 from the stack of boxes 220 onto the conveyer belt 110. In some examples, the plan may now continue as previously planned before the unexpected event occurred. In other examples, additional modifications to the plan may result in one or more additional different robot actions. In further examples, additional sensor scans may performed after removing box 322, possibly resulting in additional modifications to the plan based on additional updated sensor data.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

A block that represents a processing of information, such as a block of method 400 described above, may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software and/or hardware modules in the same physical device. However, other information transmissions may be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method comprising:
   identifying, by a control system, an object from a plurality of objects within an environment of a robotic manipulator;
   causing, by the control system, the robotic manipulator to move the identified object to a different location within the environment;
   after the robotic manipulator moves the identified object to the different location, causing, by the control system, the robotic manipulator to perform a scan of an area of the environment vacated by the identified object by causing the robotic manipulator to change position while receiving sensor data from one or more sensors on the robotic manipulator, wherein the sensor data is indicative of at least one other object previously obscured by the identified object;
   identifying, by the control system, based on the sensor data, a second object from the plurality of objects within the environment; and
   causing, by the control system, the robotic manipulator to move the second object.

2. The method of claim 1, wherein the second object is one of the at least one other object previously obscured by the identified object.

3. The method of claim 1, wherein causing the robotic manipulator to perform a scan of the area of the environment vacated by the identified object comprises causing the robotic manipulator to move into the area vacated by the identified object to receive sensor data from a point of view of the area vacated by the identified object.

4. The method of claim 1, further comprising causing a movable cart on which the robotic manipulator is mounted to move into the area of the environment vacated by the identified object in order to position the robotic manipulator to move the second object.

5. The method of claim 1, further comprising causing a movable cart on which the robotic manipulator is mounted to move into the area of the environment vacated by the identified object in order to perform an additional scan of another area of the environment.

6. The method of claim 1, further comprising:
determining a coarse representation of a specific area of the environment;
determining, based on the coarse representation of the specific area of the environment, a hypothesis indicating a possible shape of a particular object within the specific area of the environment; and
causing the robotic manipulator to perform one or more additional scans of the particular object in order to verify the determined hypothesis.

7. The method of claim 1, wherein the sensor data indicative of the at least one other object previously obscured by the identified object comprises information indicative of a shape of the at least one other object previously obscured by the identified object.

8. The method of claim 1, wherein the robotic manipulator comprises a multi-object gripper capable of simultaneously picking up at least two objects from the plurality of objects, the method further comprising causing the robotic manipulator to move one or more additional objects along with the identified object to the different location within the environment.

9. The method of claim 1, wherein causing the robotic manipulator to move the identified object to the different location within the environment comprises causing the robotic manipulator to move the identified object onto a conveyor belt.

10. The method of claim 1, further comprising determining a segmentation of at least one of the plurality of objects within the environment based on the sensor data received from the one or more sensors, and wherein identifying the second object is further based on the determined segmentation of the at least one of the plurality of objects within the environment.

11. The method of claim 10, further comprising causing the robotic manipulator to perturb at least one of the plurality of objects within the environment to determine the segmentation of the at least one of the plurality of objects within the environment.

12. The method of claim 1, further comprising:
receiving sensor data from one or more additional sensors indicative of whether the identified object has been successfully picked up and moved by the robotic manipulator; and
when the sensor data from the one or more additional sensors indicates that the identified object has not been successfully picked up and moved by the robotic manipulator, causing the robotic manipulator to perform an additional scan of the environment to determine a location of the identified object.

13. The method of claim 1, further comprising:
after moving the identified object to the different location, determining, based on sensor data from one or more additional sensors, that another object is present in the area of the environment vacated by the identified object; and
causing the robotic manipulator to perform the scan of the area of the environment vacated by the identified object in response to determining that another object is present in the area of the environment vacated by the identified object.

14. A system comprising:
a robotic manipulator;
at least one sensor on the robotic manipulator; and
a control system configured to:
identify an object from a plurality of objects within an environment of the robotic manipulator;
cause the robotic manipulator to move the identified object to a different location within the environment;
after the robotic manipulator moves the identified object to the different location, cause the robotic manipulator to perform a scan of an area of the environment vacated by the identified object by causing the robotic manipulator to change position while receiving sensor data from the at least one sensor on the robotic manipulator, wherein the sensor data is indicative of at least one other object previously obscured by the identified object;
identify, based on the sensor data, a second object from the plurality of objects within the environment; and
cause the robotic manipulator to move the second object.

15. The system of claim 14, wherein the control system is configured to cause the robotic manipulator to perform a scan of the area of the environment vacated by the identified object by causing the robotic manipulator to move into the area vacated by the identified object to receive sensor data from a point of view of the area vacated by the identified object.

16. The system of claim 14, wherein the control system is further configured to cause a movable cart on which the robotic manipulator is mounted to move into the area of the environment vacated by the identified object in order to perform an additional scan of another area of the environment.

17. The system of claim 14, wherein the control system is further configured to:
determine a coarse representation of a specific area of the environment;
determine, based on the coarse representation of the specific area of the environment, a hypothesis indicating a possible shape of a particular object within the specific area of the environment; and
cause the robotic manipulator to perform one or more additional scans of the particular object in order to verify the determined hypothesis.

18. The system of claim 14, wherein the sensor data indicative of the at least one other object previously obscured by the identified object comprises information indicative of a shape of the at least one other object previously obscured by the identified object.

19. A non-transitory computer readable medium having stored therein instructions that, when executed by a computing system, cause the computing system to perform functions comprising:
identifying an object from a plurality of objects within an environment of a robotic manipulator;
causing the robotic manipulator to move the identified object to a different location within the environment;
after the robotic manipulator moves the identified object to the different location, causing the robotic manipulator to perform a scan of an area of the environment vacated by the identified object by causing the robotic manipulator to change position while receiving sensor data from one or more sensors on the robotic manipulator, wherein the sensor data is indicative of at least one other object previously obscured by the identified object;
identifying, based on the sensor data, a second object from the plurality of objects within the environment; and causing the robotic manipulator to move the second object.

20. The non-transitory computer readable medium of claim 19, wherein the control system is configured to cause the robotic manipulator to perform a scan of the area of the environment vacated by the identified object by causing the robotic manipulator to move into the area vacated by the identified object to receive sensor data from a point of view of the area vacated by the identified object.

* * * * *